United States Patent
Zearfoss et al.

(10) Patent No.: US 12,132,799 B2
(45) Date of Patent: Oct. 29, 2024

(54) USING TOKENS FROM SILENT PUSH NOTIFICATIONS DURING APPLICATION SESSIONS TO DEVELOP DEVICE CONFIDENCE

(71) Applicant: Capital One Services, LLC, McLean, VA (US)

(72) Inventors: Patrick Zearfoss, Leesburg, VA (US); Daniel Alan Jarvis, Vienna, VA (US); Salman Haq, Herndon, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/094,520

(22) Filed: Jan. 9, 2023

(65) Prior Publication Data

US 2024/0236200 A1    Jul. 11, 2024

(51) Int. Cl.
| | |
|---|---|
| *G06F 15/16* | (2006.01) |
| *H04L 9/40* | (2022.01) |
| *H04L 67/55* | (2022.01) |
| *H04W 76/25* | (2018.01) |

(52) U.S. Cl.
CPC .......... *H04L 67/55* (2022.05); *H04L 63/0884* (2013.01); *H04W 76/25* (2018.02)

(58) Field of Classification Search
CPC ....... H04L 67/55; H04L 63/08; H04L 9/3213; H04L 9/30; H04L 2463/0884; H04L 63/0838; H04L 9/085; H04L 9/3226; H04L 9/3228; H04L 9/3271; H04L 9/3236; H04L 63/082; H04W 12/06; H04W 12/069; H04W 76/25
See application file for complete search history.

(56) References Cited

U.S. PATENT DOCUMENTS

| | | | |
|---|---|---|---|
| 6,088,450 A * | 7/2000 | Davis | H04W 12/065 |
| | | | 235/382 |
| 8,086,667 B1 * | 12/2011 | Randall | G06F 9/541 |
| | | | 709/218 |
| 9,119,067 B2 * | 8/2015 | Santamaria | H04W 12/069 |
| 9,369,290 B2 | 6/2016 | Lambert | |
| 10,462,113 B1 * | 10/2019 | Venkataramani | H04L 9/0825 |
| 10,489,789 B1 * | 11/2019 | Gerling-Ospina | H04L 67/55 |
| 10,855,664 B1 * | 12/2020 | Ziraknejad | H04W 4/02 |
| 11,406,196 B2 * | 8/2022 | Canfield | A47C 20/08 |
| 2009/0052870 A1 * | 2/2009 | Marsh | H04N 21/4583 |
| | | | 386/292 |
| 2014/0007213 A1 * | 1/2014 | Sanin | H04L 63/0807 |
| | | | 726/9 |

(Continued)

*Primary Examiner* — Dustin Nguyen
*Assistant Examiner* — Hao H Nguyen
(74) *Attorney, Agent, or Firm* — Sterne, Kessler, Goldstein & Fox P.L.L.C.

(57) ABSTRACT

Aspects disclosed are directed to a system and methods that device authentication. The system at least transmits a silent push notification to an application installed on a client device. The silent push notification includes a push token provided by a push service and an embedded secret. A response to the silent push notification can be received with a further embedded secret. The embedded secret and the further embedded secret can be compared to determine if they match. If the embedded secret and the further embedded secret match, the client device can be authenticated.

20 Claims, 7 Drawing Sheets

(56) References Cited

U.S. PATENT DOCUMENTS

| | | | |
|---|---|---|---|
| 2014/0230032 A1* | 8/2014 | Duncan | H04L 63/0861 |
| | | | 726/7 |
| 2015/0067062 A1* | 3/2015 | Bleau | H04L 67/55 |
| | | | 709/204 |
| 2016/0337461 A1* | 11/2016 | Vyrros | H04L 67/53 |
| 2017/0237734 A1* | 8/2017 | Hallenborg | H04W 12/069 |
| | | | 726/7 |
| 2018/0260542 A1* | 9/2018 | Larvol | H04L 51/23 |
| 2019/0007398 A1* | 1/2019 | Jaladi | H04L 63/0853 |
| 2019/0073696 A1* | 3/2019 | Ericson | G06Q 30/0273 |
| 2019/0190992 A1* | 6/2019 | Warrick | H04L 67/125 |
| 2019/0206525 A1* | 7/2019 | Kartoun | G16H 50/20 |
| 2019/0305955 A1* | 10/2019 | Verma | H04L 9/3247 |
| 2019/0312862 A1* | 10/2019 | Jaladi | H04L 63/18 |
| 2019/0313138 A1* | 10/2019 | Nagl | H04N 21/4882 |
| 2019/0320442 A1* | 10/2019 | Thies | H04W 72/53 |
| 2019/0327322 A1* | 10/2019 | Justin | H04L 67/55 |
| 2020/0220853 A1* | 7/2020 | Xu | G06F 16/955 |
| 2020/0272383 A1* | 8/2020 | Kusumoto | G06F 3/1289 |
| 2020/0344047 A1* | 10/2020 | Allen | H04L 9/3215 |
| 2021/0125194 A1* | 4/2021 | Holland, IV | H04L 9/30 |
| 2021/0406900 A1* | 12/2021 | O'Toole | G06Q 30/06 |
| 2022/0124454 A1* | 4/2022 | Lewin | G16Y 20/10 |
| 2022/0247836 A1* | 8/2022 | Duong | H04W 12/72 |
| 2022/0278981 A1* | 9/2022 | Hardesty | G06K 19/06037 |
| 2023/0064529 A1* | 3/2023 | Nunez | H04L 9/3213 |

\* cited by examiner

USING TOKENS FROM SILENT PUSH NOTIFICATIONS DURING APPLICATION SESSIONS TO DEVELOP DEVICE CONFIDENCE

TECHNICAL FIELD

Aspects relate to device authentication, specifically a system that uses push tokens and push notifications to authenticate a device.

BACKGROUND

Identifying and establishing confidence in a device is important because once a device is identified, and confidence is established in the device, other devices in the ecosystem in which the device operates may be assured that when sending information to the device, the data they are sending will go to an intended destination and is unlikely to be compromised. Attackers, however, will often try to hack into or imitate devices in order to gain access to a network, an account, or data, thus undermining this confidence. Thus, improved methods are needed to allow devices to develop confidence amongst each other so that devices can interoperate securely.

BRIEF DESCRIPTION OF THE DRAWINGS

The accompanying drawings, which are incorporated herein and form a part of the specification, illustrate aspects of the present disclosure and, together with the description, further serve to explain the principles of the disclosure and to enable a person skilled in the art to make and use the aspects.

DETAILED DESCRIPTION

Figure 1:
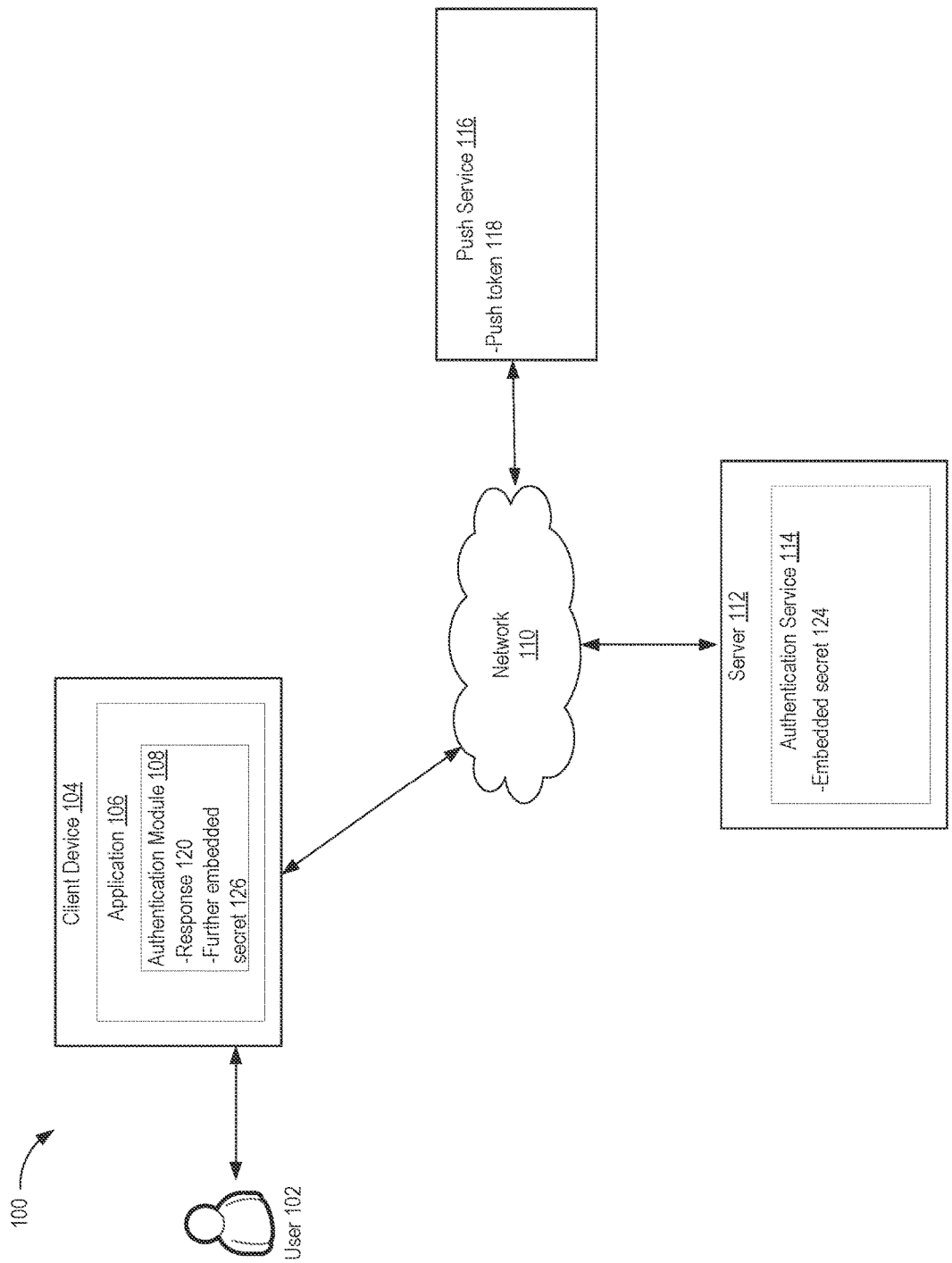
FIG. 1 is a system for authenticating a device using silent push notifications according to aspects.

Aspects disclosed herein relate to a system and methods that allow for device authentication. The system and methods achieves this through the use of push tokens and silent push notifications transmitted between a source device and a client device on which an application is installed.

Typically, push notifications are a common way for applications to send messages to users when they are not using a device. Push tokens are transmitted via push notification networks. Push notification networks are typically operated by smartphone operating system providers such as Apple™ and Google™. Push notification networks function by providing a push token to uniquely identify a device and application pair in their network. Push notifications typically generate a prompt on a graphical user interface (GUI) of a device, either prompting a user to take some action or delivering a message. Silent push notifications operate similarly to push notifications, except they do not generate a prompt on the GUI of the device or illicit interaction by a user. Rather, they can send a message or data directly to an application for the application to process.

Because the push token is provided by the operating system via the push notification network to uniquely identify the application and device pair, the push token can provide an excellent source of information for identifying a device and establishing device stability. This is because it provides a third-party source of information that may be used to identify a device. Because the push token is provided by a third-party, it provides an independent source of information that is less susceptible to compromise, even if information about the device itself is compromised.

Aspects disclosed herein use push tokens and silent push notifications to authenticate a device. In some aspects, the authentication can be enhanced by embedding a secret in the silent push notification to be transmitted along with the push token. The embedded secret can be a variable, an alphanumeric string, a numeric or textual value, a question-answer pair, etc., or a combination thereof. In some aspects, the embedded secret can be transmitted to an application on a client device. The application refers to a software application (e.g., a mobile application) installed on the client device. In some aspects, once received, the application can send the same embedded secret back to a source device (e.g., a server) that transmitted the embedded secret to the client device. This can be in the form of a further embedded secret of a further silent push notification sent from the client device to the source device. The source device can then compare the embedded secret to the further embedded secret to determine if they match. If they match, the system can authenticate the client device because the source device can be confident that the client device is receiving messages it is intended to receive. Furthermore, the source device is obtaining data from the client device that it expects to receive based on transmitting the embedded secret.

In some aspects, the system can be configured so that the client device performs an operation on the embedded secret and the source device performs a reverse operation on the further embedded secret in an attempt to obtain the embedded secret. The operation can be, for example, a hashing operation or a reordering of bytes of the embedded secret to obtain the further embedded secret. The source device can then perform a reverse operation on the further embedded secret to try to recover the embedded secret. In some aspects, if the source device is able to recover the embedded secret, the source device can authenticate the client device. These and other aspects will be discussed in further detail below.

The system can be used in a variety of use cases. For example, if the application is a mobile banking application, the system can be used to verify the client device on which the application is running in cases where high risk transactions are being performed using the application. For example, if the application is used to transfer funds, the transaction can be flagged as a high risk transaction, and the system can be used to authenticate the client device before the transaction is processed or approved for processing. In such a case, a source device can be alerted that the application is being used to perform the high risk transaction. Based on the flagged transaction, the source device can transmit the silent push notification to the client device (specifically an application installed on the client device), thus initiating the processes to be performed to authenticate the client device. While mobile banking is mentioned, a person skilled in the art will recognize that the system can be used in any other case in which high risk or sensitive transactions are being performed. Such use cases can include instances where confidential data is being transmitted (e.g., medical records, classified information, etc.), such that a client device should be verified for added security.

Certain aspects disclosed may be directed to a computing system that performs the aforementioned device authentication by performing at least the steps of: transmitting a silent push notification to an application installed on a client device, wherein the silent push notification includes a push token provided by a push service and an embedded secret. A response to the silent push notification can be received from the application. In some aspects, the response can include a further embedded secret. In some aspects, the further embedded secret can have the same value as the embedded secret or have a different value determined based on an operation performed on the embedded secret. In some aspects, the embedded secret and the further embedded secret can be compared to determine if they match. In some aspects, and in the case where an operation is performed on the embedded secret and the reverse operation is performed on the further embedded secret, if the results of the reverse operation yields a value the same as the value of the embedded secret, the source device can authenticate the client device.

In some aspects, the system can further perform the authentication by measuring a response time between when the silent push notification is transmitted to the application and when the response to the silent push notification is received from the application. If the response time is less than a threshold value, such as a time-based threshold value, the source device can authenticate the client device.

In some aspects, the source device can determine if the application has an active session open at the time when the silent push notification is transmitted to the application. If the application does not have an active session, the source device can determine not to authenticate the client device, and can transmit a notification to a user to perform an action for an account accessed via the application. The reason for this is that if the application does not have an active session, yet a silent push notification is initiated to be sent to the application, it could be an indication that an attacker is trying to illicitly gain access to the application or some type of transaction, data, or network, by imitating the client device. The attacker may be trying to initiate transmission of the silent push notification. The silent push notification should typically only occur if the application has an active session where a user is trying to perform some type of transaction that is being flagged. In some aspects, the notification can prompt a user to change a password for any accounts that can be accessed via the application, lock any accounts that can be accessed via the application, or otherwise take corrective action on accounts that can be accessed via the application.

In some aspects, the source device can receive historic responses to previous silent push notifications to the client device. Using a machine learning model, the source device can analyze the historic responses to generate a device risk score. In some aspects, a device risk score greater than a further threshold value, such as a risk-based threshold value, can indicate that responses from the client device should not be trusted. In some aspects, based on the device risk score being less than the further threshold value. Alternatively, based on the device risk score being greater than or equal to the further threshold value the source device can determine to not authenticate the client device.

In some aspects, and for added security, the source device can encrypt the silent push notification, and transmit a public key with the encrypted silent push notification to the client device, wherein the public key is to be used by the application to decrypt the silent push notification. In this aspect, public-private key pairs can be pre-registered for the application such that the application can use a private key to decrypt the silent push notification based on an associated public key.

In some aspects, the embedded secret can be transmitted in more than one transmission. For example, the embedded secret can comprise several values, each of which must be transmitted to the client device and back to the source device to be matched before the client device can be authenticated. The purpose is to add a further level of security when authenticating the client device.

The following aspects are described in sufficient detail to enable those skilled in the art to make and use the disclosure. It is to be understood that other aspects are evident based on the present disclosure, and that system, process, or mechanical changes may be made without departing from the scope of aspects of the present disclosure.

In the following description, numerous specific details are given to provide a thorough understanding of the disclosure. However, it will be apparent that the disclosure may be practiced without these specific details. In order to avoid obscuring an aspect of the present disclosure, some well-known circuits, system configurations, architectures, and process steps are not disclosed in detail.

The drawings showing aspects of the system are semi-diagrammatic and not to scale. Some of the dimensions are for the clarity of presentation and are shown exaggerated in the drawing figures. Similarly, although the views in the drawings are for ease of description and generally show similar orientations, this depiction in the figures is arbitrary for the most part. Generally, the disclosure may be operated in any orientation.

The term "module" or "unit" referred to herein may include software, hardware, or a combination thereof in an aspect of the present disclosure in accordance with the context in which the term is used. For example, the software may be machine code, firmware, embedded code, or application software. For example, the hardware may be circuitry, a processor, a special purpose computer, an integrated circuit, integrated circuit cores, or a combination thereof. Further, if a module or unit is written in the system or apparatus claim section below, the module or unit is deemed to include hardware circuitry for the purposes and the scope of the system or apparatus claims.

The term "service" or "services" referred to herein can include a collection of modules or units. A collection of modules or units may be arranged, for example, in software or hardware libraries or development kits in an aspect of the present disclosure in accordance with the context in which the term is used. For example, the software or hardware libraries and development kits may be a suite of data and programming code, for example pre-written code, classes, routines, procedures, scripts, configuration data, or a combination thereof, that may be called directly or through an application programming interface (API) to facilitate the execution of functions of the system.

The modules, units, or services in the following description of the aspects may be coupled to one another as described or as shown. The coupling may be direct or indirect, without or with intervening items between coupled modules, units, or services. The coupling may be by physical contact or by communication between modules, units, or services.

System Overview and Function

FIG. 1 is a system 100 for authenticating a device using silent push notifications according to aspects. In some aspects, system 100 can include a client device 104, a network 110, a push service 116, and a server 112. In some aspects, the client device 104 can further include an application 106 installed thereon, which, in some aspects, includes an authentication module 108. In some aspects, the server 112 can further include an authentication service 114.

The client device 104 may be any of a variety of centralized or decentralized computing devices. For example, the client device 104 may be a mobile device, a laptop computer, or a desktop computer. The client device 104 can function as a stand-alone device separate from other devices of the system 100. Stand-alone refers to a device being able to work and operate independently of other devices. In some aspects, the client device 104 can store and execute the application 106.

The application 106 refers to a discrete software that provides some specific functionality. For example, the application 106 may be a mobile application that allows a user 102 to perform some functionality. The functionality can, for example and without limitation, allow the user 102 to perform banking, data transfers, or commercial transactions. In some aspects, the application 106 may be a desktop application that allows the user 102 to perform the aforementioned functionalities.

In some aspects, the client device 104 can be coupled to the server 112 and the push service 116 via a network 110. The server 112 may be part of a backend computing infrastructure, including a server infrastructure of a company or institution, to which the application 106 belongs. While the server 112 is described and shown as a single component in FIG. 1, this is merely exemplary. In some aspects, the server 112 can comprise a variety of centralized or decentralized computing devices. For example, the server 112 may include a mobile device, a laptop computer, a desktop computer, grid-computing resources, a virtualized computing resource, cloud-computing resources, peer-to-peer distributed computing devices, a server farm, or a combination thereof. The server 112 may be centralized in a single room, distributed across different rooms, distributed across different geographic locations, or embedded within the network 110. While the devices comprising the server 112 can couple with the network 110 to communicate with the client device 104, the devices of the server 112 can also function as stand-alone devices separate from each other and the client device 104.

In some aspects, if the server 112 is implemented using cloud-computing resources, the cloud-computing resources may be resources of a public or private cloud. Examples of a public cloud include, without limitation, Amazon Web Services™ (AWS), IBM Cloud™, Oracle Cloud Solutions™, Microsoft Azure Cloud™, and Google Cloud™. A private cloud refers to a cloud environment similar to a public cloud with the exception that it is operated solely for a single organization.

In some aspects, the server 112 can couple to the client device 104 to allow the application 106 to function. For example, in some aspects, both the client device 104 and the server 112 can have at least a portion of the application 106 installed thereon as instructions on a non-transitory computer readable medium. The client device 104 and the server 112 can both execute portions of the application 106 using client-server architectures, to allow the application 106 to function.

The push service 116 refers to a service of a push notification network. In some aspects, the push service 116 and the push notification network may be operated by an independent third-party. For example, the push service 116 and the push notification network may be operated by a provider of the operating system installed on the client device 104. The provider may be, for example and without limitation, Apple™, Google™, or Microsoft™. In some aspects, the push service 116 can function to provide a push token 118 to the authentication module 108. The push token 118 refers to a unique key, created and assigned by the push service 116 to create a pairing between the application 106 and the client device 104. In other words, the push token 118 can link the application 106 and the client device 104, to uniquely identify the application 106 and the client device 104 as being associated or tied to one another.

In some aspects, the push service 116 can transmit the push token 118 to the authentication module 108 (and in effect the client device 104) via the network 110. The network 110 refers to a telecommunications network, such as a wired or wireless network. The network 110 can span and represent a variety of networks and network topologies. For example, the network 110 can include wireless communication, wired communication, optical communication, ultrasonic communication, or a combination thereof. For example, satellite communication, cellular communication, Bluetooth, Infrared Data Association standard (IrDA), wireless fidelity (WiFi), and worldwide interoperability for microwave access (WiMAX) are examples of wireless communication that may be included in the network 110. Cable, Ethernet, digital subscriber line (DSL), fiber optic lines, fiber to the home (FTTH), and plain old telephone service (POTS) are examples of wired communication that may be included in the network 110. Further, the network 110 can traverse a number of topologies and distances. For example, the network 110 can include a direct connection, personal area network (PAN), local area network (LAN), metropolitan area network (MAN), wide area network (WAN), or a combination thereof. For illustrative purposes, in the aspect of FIG. 1, the system 100 is shown with the client device 104 and the server 112 as end-points of the network 110. This is exemplary and it is understood that the system 100 can have a different partition between the client device 104, the server 112, and the network 110. For example, the client device 104 and the server 112 can also function as part of the network 110.

In some aspects, the client device 104 can include at least the authentication module 108. In some aspects, the authentication module 108 may be a module of the application 106. In some aspects, the authentication module 108 can enable the application 106 to receive the push token 118 as part of a silent push notification. The silent push notification may be transmitted to the application 106 by the server 112. In some aspects, the server 112 can transmit both the push token 118 and an embedded secret 124 to the application 106 as part of the silent push notification. In some aspects, the server 112 can utilize or call on the push service 116 to send the push token 118 to the server 112, which the server 112 can then send to the client device 104 as part of the silent push notification.

In some aspects, the application 106 can receive the silent push notification. Depending on how the system 100 is configured, the application 106 can perform either of two functions on the embedded secret 124. In some aspects, the first function can be that the application 106 can respond to the silent push notification by generating a further silent push notification with a further embedded secret 126. The further embedded secret 126 can have the same value as the embedded secret 124. Thus, the application 106 can return the embedded secret 124 back to the server 112 as the further embedded secret 126 via a response 120. The purpose of responding in this manner is to inform the server 112 that the embedded secret 124 was received by the application 106, so that the server 112 can validate that it is transmitting data to an intended and trusted device.

In some aspects, the client device 104 can transmit the further silent push notification (including the further embedded secret 126) to the server 112 so that the server 112 can compare the embedded secret 124 and the further embedded secret 126 to determine if they have the same value (i.e., they match). In some aspects, the comparison can be performed by the authentication service 114. In some aspects, if the embedded secret 124 and the further embedded secret 126 have the same value, the server 112 can validate that it is transmitting data to an intended and trusted device, and can authenticate the client device 104 so that further data can be transmitted to/from the client device 104.

In some aspects, the second function performed can be that the application 106 can perform an operation on the embedded secret 124. In some aspects, the operation can include a hashing or a reordering of bytes of data of the embedded secret 124. In some aspects, the operation can result in the generation of a new value based on the embedded secret 124, which can be assigned as the further embedded secret 126. In some aspects, once the further embedded secret 126 is generated, it can be transmitted as part of a further silent push notification to the server 112 in a manner similar to what was described before with respect to the first function. Accordingly, the server 112 can perform a reverse operation on the further embedded secret 126 to see if it can recover a value equivalent to the embedded secret 124. As an example, if the operation performed by the application 106 is a hashing operation on the embedded secret 124, the server 112 can perform a reverse operation of the hashing operation on the further embedded secret 126 to try to recover the value of the embedded secret 124. If after performing the reverse operation of the hashing operation, a value equivalent to the embedded secret 124 is obtained, the server 112 can validate that it is transmitting data to an intended and trusted device. Furthermore, the server 112 can authenticate the client device 104 so that further data can be transmitted to/from the client device 104. Similarly, if the operation is a reordering of the bytes of data of the embedded secret 124, a reverse reordering can be performed by the server 112 to try to recover the original order of the embedded secret 124.

Using the aforementioned techniques in conjunction with silent push notifications, the system 100 can authenticate the client device 104 as a trusted device. This is because by transmitting and comparing the embedded secret 124 and the further embedded secret 126, and determining if the same values can be derived based on/from each of those parameters, the server 112 can determine that data is being transmitted and received by an intended device.

In some aspects, the system 100 can be configured such that further considerations can be taken into account in order to authenticate the client device 104. For example, in some aspects, a response time can be taken into account by the server 112 when determining whether to authenticate the client device 104. By way of example, a response time between when the silent push notification is transmitted to the application 106 and when the response to the silent push notification is received from the application 106 by the server 112 can be measured. A predetermined threshold value can be set as part of the configuration of the system 100, such that if the response time is greater than the threshold value it can indicate something erroneous or suspicious about the transmission (e.g., a man-in-the-middle attack, etc.). In some aspects, the server 112 can analyze the response time, and determine if the response time is less than or equal to the threshold value or greater than the threshold value. For example, if the response time is less than or equal to the threshold value, the server 112 can authenticate the client device 104. If the response time is greater than the threshold value, the server 112 can determine not to authenticate the client device 104.

In some aspects, the system 100 can be configured such that it can take into account whether the application 106 has an active session at the time a silent push notification is transmitted to the application 106. In some aspects, this determination can be made by the server 112. The server 112 can, for example, review log files indicating whether the application 106 has an active session, or determine whether a response (or lack thereof) from the application 106 indicates an active session. For example, if the server 112 transmits the silent push notification to the application 106 and receives a bounce back message, a message indicating that the application is offline, or does not receive any response at all, the server 112 can determine that the application does not have an active session. The lack of an active session can indicate that an unauthorized device is imitating the client device 104 or potentially fraudulent activity is taking place. This is because a silent push notification should only be transmitted to the client device 104 when the application 106 has an active session, and in response to a user 102 trying to perform a flagged transaction. In some aspects, and in response to determining the application does not have an active session, the server 112 can determine not to authenticate the client device 102. In some aspects, the server 112 can further be configured to transmit a notification to a user 102 to perform an action for an account accessed via the application 106. In some aspects, the notification can prompt a user 102 to change a password for any accounts that can be accessed via the application 106, lock any accounts that can be accessed via the application 106, or otherwise take corrective action on accounts that can be accessed via the application 106.

In some aspects, the server 112 can take into account historic responses of the client device 104 to previous silent push notifications. In some aspects, the historic responses can indicate, for example, how many times the client device 104 successfully responded to embedded secrets in the past, the typical response times for the client device 104, etc. In some aspects, the historic responses can be input into a machine learning model as features to the model. The machine learning model can be trained to generate a device risk score for the client device 104. The device risk score refers to a numerical value, percentage, or classification indicating how trustworthy the client device 104 is based on how it has historically responded to silent push notifications. This can be factored into the determination of whether to authenticate the client device 104 or not. For example, if the client device 104 has a history of responding with further embedded secrets that do not match the embedded secrets sent to it, it can be classified as a low trustworthy device, and the server 112 can determine not to authenticate the device despite the present further embedded secret 126 matching the embedded secret 124. In other aspects, if the client device 104 has a history of responding with no errors when some percentage of delivery errors are expected, the client device 104 can also be classified as a low trustworthy device, and the server 112 can determine not to authenticate the device despite the present further embedded secret 126 matching the embedded secret 124.

In some aspects, if the machine learning model is trained to generate the device risk score as a percentage, a predetermined further threshold value can be set such that the client device 104 can be classified as a high or low trustworthy device based on where the device risk score falls in relation to the further threshold value. For example, if the device risk score is less than the further threshold value, the server 112 can determine that the client device 104 is a low risk device and can authenticate the client device 104. If, however, the device risk score is greater than or equal to the further threshold value, the server 112 can determine that the client device 104 is a high risk device and can determine not to authenticate the client device 104. These are merely exemplary ways of training the machine learning model to classify the client device 104. A person skilled in the art reading this disclosure can determine similar methods and criteria that can be used to classify the client device 104 so as to assist in authenticating the client device 104.

The machine learning model can include any number of architectures and algorithms trained to generate the device risk score. For example, the machine learning model architectures can include neural networks, recurrent neural networks, long short-term memory (LSTM) models, etc. The machine learning model algorithms used to train the models or perform the classification can include for example, Linear Regression, Logistic Regression, Decision Tree, Support Vector Machine, Naive Bayes, K-Nearest Neighbor, K-Means, Random Forest, Dimensionality Reduction Algorithms, Gradient Boosting algorithms, etc.

In some aspects, the system 100 can be configured to add further security measures to ensure that the client device 104 is an authentic device. For example, in some aspects the server 112 can encrypt the silent push notification, and transmit a public key with the encrypted silent push notification. The public key can be used by the application 106 to decrypt the silent push notification. In such a configuration, it is assumed that public-private key pairs are pre-registered for the application 106 such that the application 106 can use a private key to decrypt the silent push notification based on an associated public key.

In some aspects, the system 100 can also be configured to add further security measures by having the server 112 transmit the embedded secret 124 in more than one transmission. In this configuration, the embedded secret 124, rather than be one value, can comprise multiple values, that are each transmitted to the client device 104 such that the client device 104 performs either of the two functions previously mentioned (e.g., either sending back a further embedded secret 126 with the same value as the embedded secret 124, or performing an operation on the embedded secret and sending back the value generated as the further embedded secret 126). In some aspects, if each of these transmitted embedded secrets is matched to the further embedded secrets, the server 112 can authenticate the client device 104.

The aforementioned functions of the system 100 can be performed using the modules, units, or services of the client device 104 and the server 112 and/or may be implemented as instructions stored on a non-transitory computer readable medium to be executed by one or more computing units such as a processor, a special purpose computer, an integrated circuit, integrated circuit cores, or a combination thereof. The non-transitory computer readable medium may be implemented with any number of memory units, such as a volatile memory, a nonvolatile memory, an internal memory, an external memory, or a combination thereof. The non-transitory computer readable medium may be integrated as part of the system 100 and/or installed as a removable portion of the system 100.

It has been discovered that the system 100 described above improves the state of the art because it provides a robust, enhanced, and secure mechanism to perform device authentication. The improvements stem from the use of the push token 118 and the embedded secret 124 as part of the silent push notification transmitted to the client device 104 to authenticate the client device 104. Because the push token 118 is provided by the operating system via the push notification network to uniquely identify the application 106 and client device 104 pair, the push token 118 already provides an excellent source of information for identifying a device and establishing device stability. Adding the embedded secret 124 and having the client device 104 process the embedded secret 124 and transmit back to the server 112 a further embedded secret 126 that can be compared to the embedded secret 124 to determine a match between the two, further enhances the authentication mechanism. Specifically, the system 100 provides two sources of information for identifying the client device 104.

Furthermore, the ability of system 100 to be configured to take into consideration other factors in order to authenticate the client device 104 provides further enhancements. For example, the system 100 being configurable to take into account response times, whether the application 106 has an active session when the silent push notification is transmitted by the server 112 to the client device 104, historic responses to previous silent push notifications to the client device 104 can also provide added layers of security and authentication. Additionally, the system 100 being able to encrypt the silent push notification using public-private key encryption technologies, or transmitting the embedded secret in more than one transmission adds further layers of security that provide a robust architecture to perform the authentication. Conventional systems do not have these aforementioned combinations of features.

Methods of Operation

Figure 2:
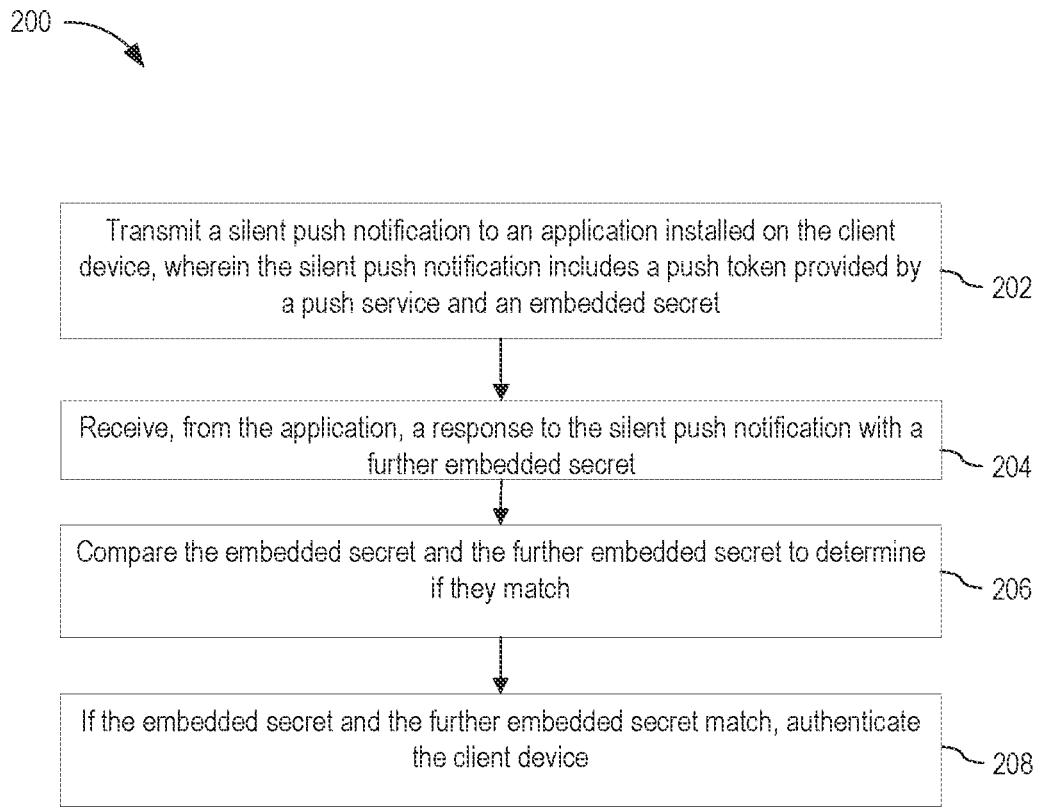
FIG. 2 is a method of operating the system to authenticate a device using silent push notifications according to aspects.

FIG. 2 is a method 200 of operating the system 100 to authenticate a device using silent push notifications according to aspects. Method 200 can be performed by the server 112. In some aspects, method 200 proceeds by having the server 112 transmit a silent push notification to an application 106 installed on the client device 104, wherein the silent push notification includes a push token 118 provided by a push service 116 and an embedded secret 124 provided by the server 112, as shown in step 202. In step 204, the server 112 can receive from the application 106 a response to the silent push notification with a further embedded secret 126. At step 206, the embedded secret 124 and the further embedded secret 126 can be compared to determine if they match. If the embedded secret 124 and the further embedded secret 126 match, the server 112 can authenticate the client device 104, as shown in step 208. In some aspects, further embedded secret 126 can result from two operations that can be performed by the client device 104. The first is to have the client device 104 transmit back to the server 112 a value for the further embedded secret 126 that is the same as that for the embedded secret 124. The second is to have the client device 104 perform an operation on the embedded secret 124 to generate the further embedded secret 126, which can then be transmitted to the server 112. In some aspects, the operation can include a hashing function or a reordering of the bytes of data of the embedded secret 124.

Figure 3:
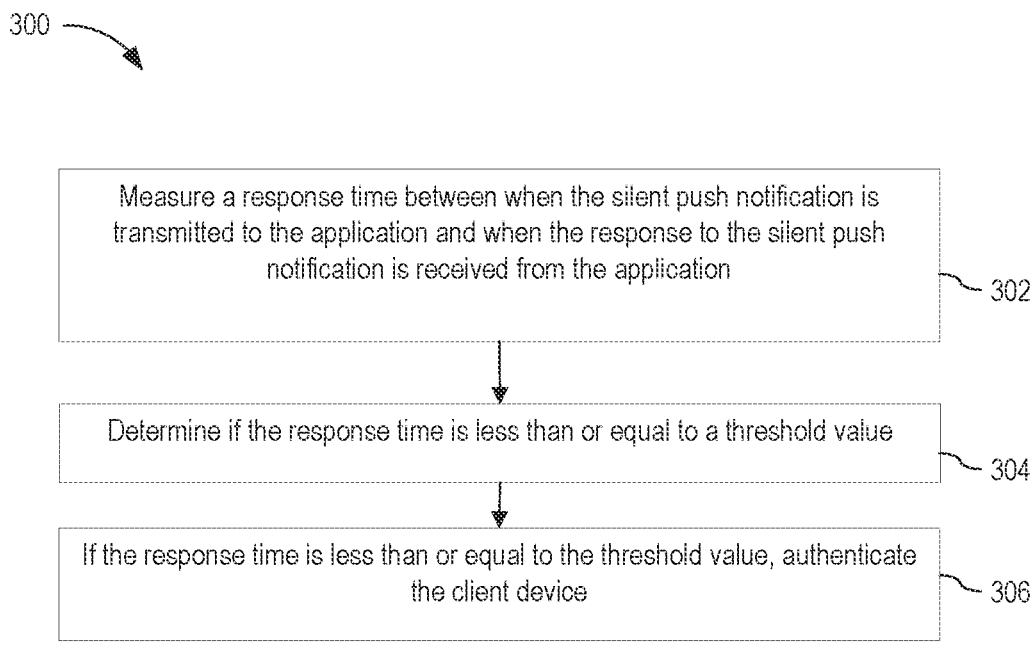
FIG. 3 is a further method of operating the system to authenticate a device based on a measured response time according to aspects.

FIG. 3 is a further method 300 of operating the system 100 to authenticate a device based on a measured response time according to aspects. Method 300 can be performed by the server 112. In some aspects, method 300 proceeds by having the server 112 measure a response time between when the silent push notification is transmitted to the application 106 and when the response to the silent push notification is received from the application 106, as shown in step 302. At step 304, the server 112 can determine if the response time is less than or equal to a threshold value. At step 306, if the response time is less than or equal to the threshold value the server 112 can authenticate the client device 104.

Figure 4:
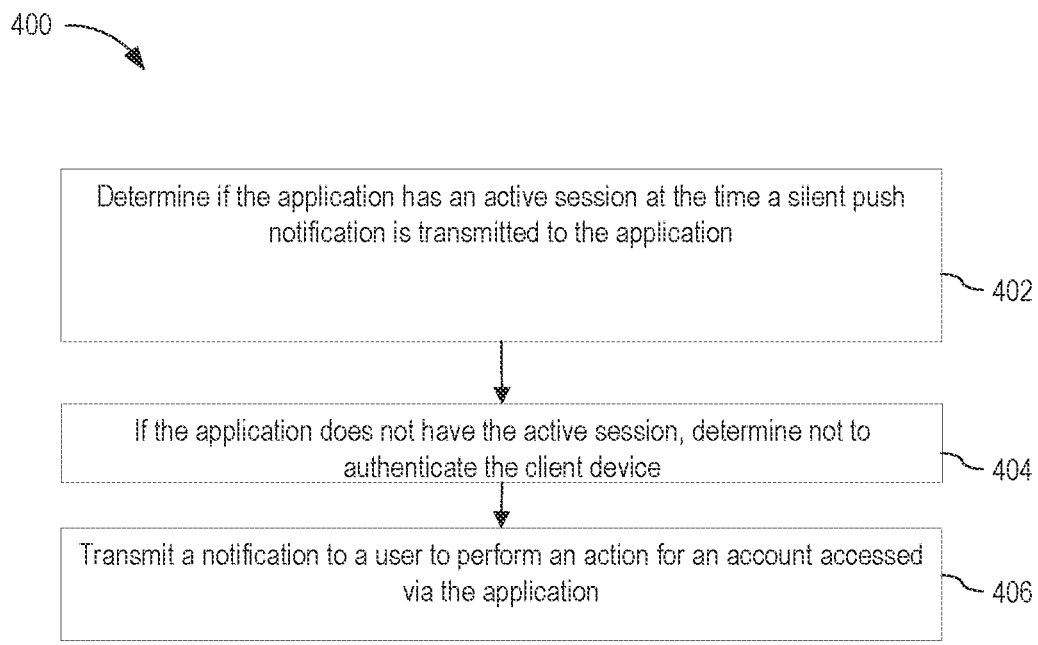
FIG. 4 is a further method of operating the system to authenticate a device based on determining if an application has an active session at the time the silent push notification is transmitted according to aspects.

FIG. 4 is a further method 400 of operating the system 100 to authenticate a device based on determining if the application 106 has an active session at the time the silent push notification is transmitted according to aspects. Method 400 can be performed by the server 112. In some aspects, method 400 proceeds by having the server 112 determine if the application 106 has an active session at the time a silent push notification is transmitted to the application 106, as shown in step 402. This can be done by, for example, reviewing a log file indicating whether the application 106 has an active session, or by receiving an indication that the application 106 does not have an active session, the indication comprising a bounce back message or no response. If the application 106 does not have the active session, the server 112 can determine not to authenticate the client device 104, as shown in 404. At step 406, the server 112 can transmit a notification to a user 102 to perform an action for an account accessed via the application 104. In some aspects, the notification can prompt a user 102 to change a password for any accounts that can be accessed via the application 106, lock any accounts that can be accessed via the application 106, or otherwise take corrective action on accounts that can be accessed via the application 106.

Figure 5:
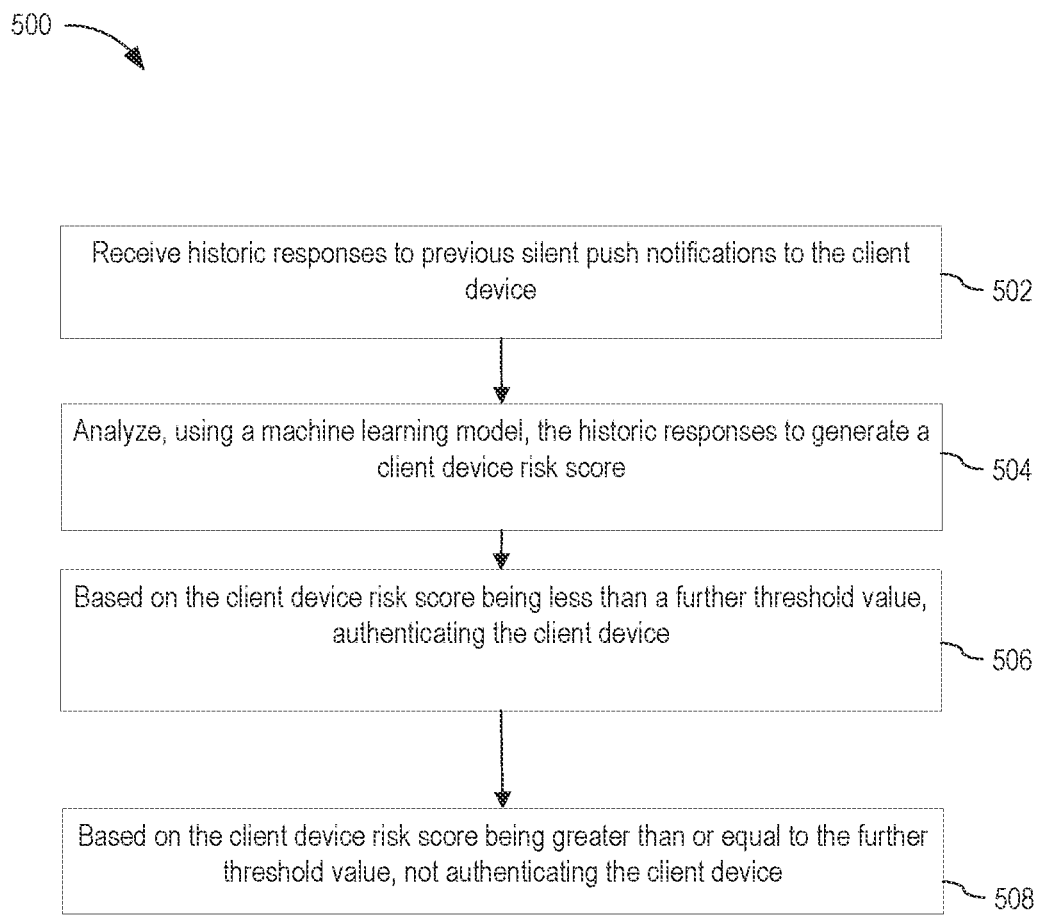
FIG. 5 is a further method of operating the system to authenticate a device based on historic responses to previous silent push notifications to the device according to aspects.

FIG. 5 is a further method 500 of operating the system 100 to authenticate a device based on historic responses to previous silent push notifications to the device according to aspects. Method 500 can be performed by the server 112. In some aspects, method 500 proceeds by having the server 112 receive historic responses to previous silent push notifications to the client device 104, as shown in step 502. At step 504, the server 112 can analyze, using a machine learning model, the historic responses to generate a client device risk score. At step 506, based on the client device risk score being less than a further threshold value, the server 112 can authenticate the client device 104. At step 508, based on the client device risk score being greater than or equal to the further threshold value, the server 112 can determine to not authenticate the client device 104.

Figure 6:
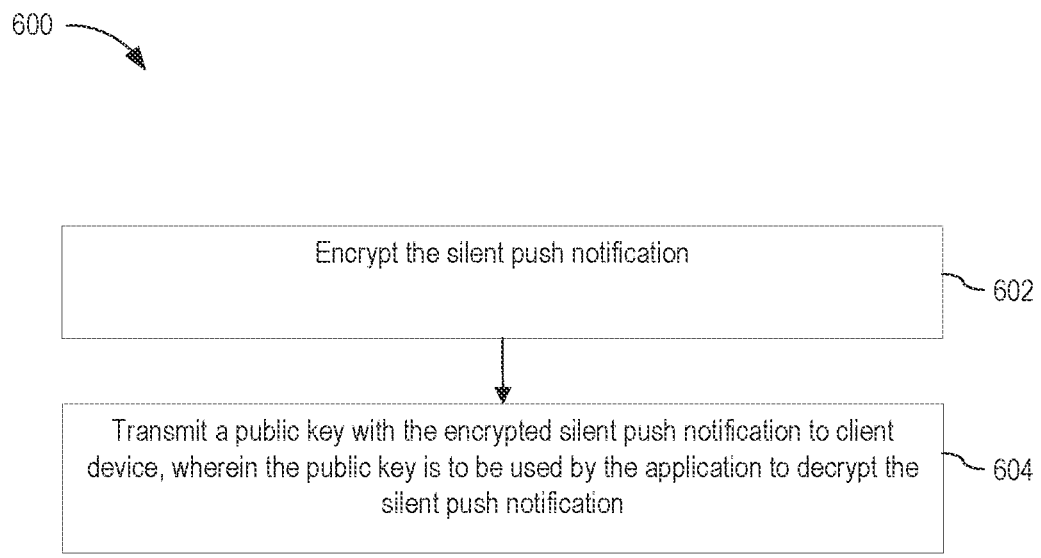
FIG. 6 is a further method of operating the system to encrypt the silent push notification using a public-private key encryption scheme according to aspects.

FIG. 6 is a further method 600 of operating the system 100 to encrypt the silent push notification using a public-private key encryption scheme according to aspects. Method 600 can be performed by the server 112. In some aspects, method 600 proceeds by having the server 112 encrypt the silent push notification, as shown in step 602. At step 604, the server 112 can transmit a public key with the encrypted silent push notification to client device 104, wherein the public key is to be used by the application 106 to decrypt the silent push notification.

In some aspects, operation of methods 200, 300, 400, 500, and 600 are performed, for example, by system 100, in accordance with aspects described above.

Components of the System

Figure 7:
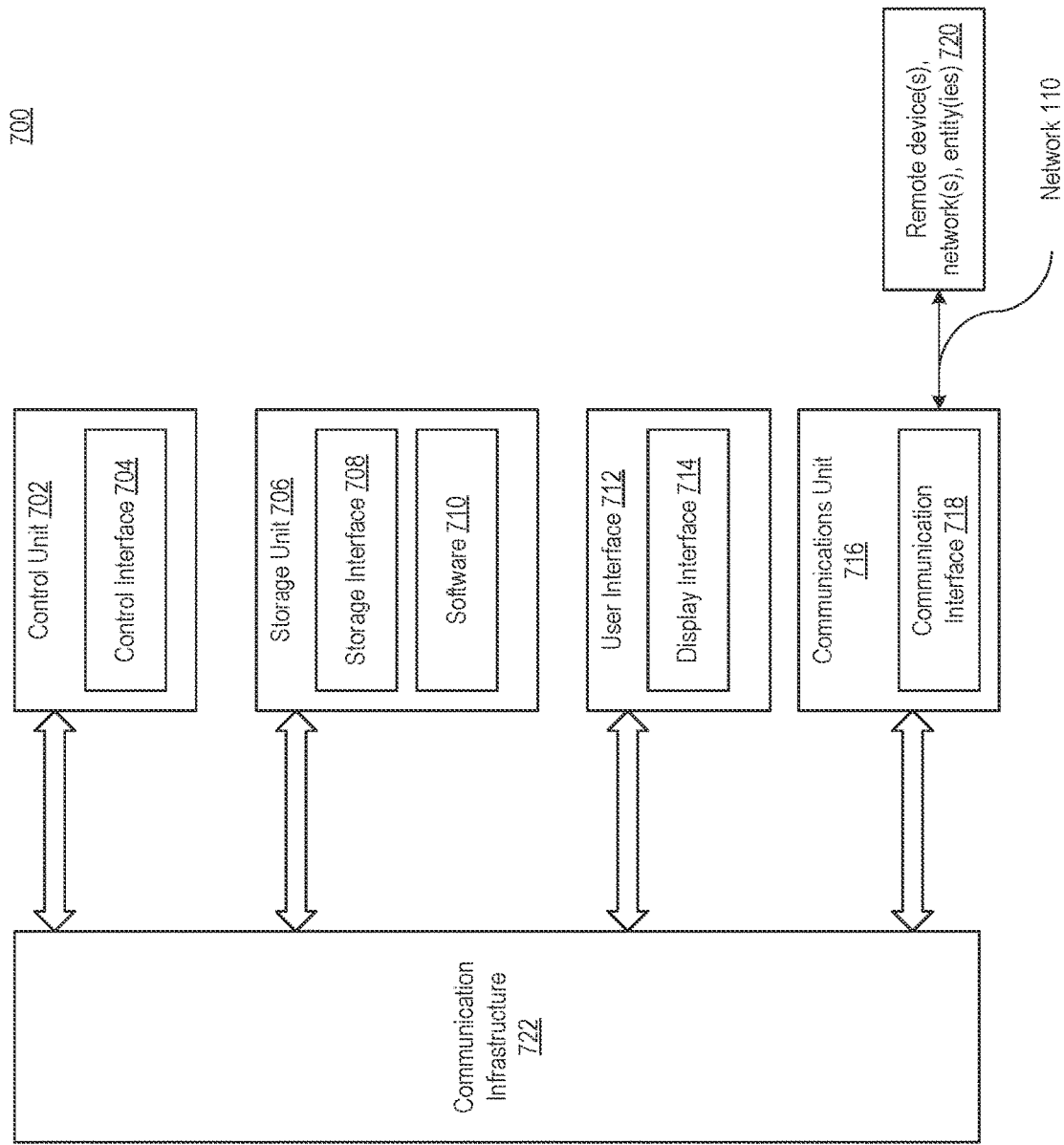
FIG. 7 is an example architecture of components that can implement the system according to aspects.

FIG. 7 is an example architecture 700 of components that can implement the system 100 according to aspects. The components may be implemented by any of the devices of the system 100, for example the client device 104, the server 112, or the push service 116. In some aspects, the components may include a control unit 702, a storage unit 706, a communication unit 716, and a user interface 712. The control unit 702 may include a control interface 704. The control unit 702 may execute a software 710 (e.g., the application 106, the authentication module 108, or the authentication service 114) to provide some or all of the intelligence of system 100. The control unit 702 may be implemented in a number of different ways. For example, the control unit 702 may be a processor, an application specific integrated circuit (ASIC), an embedded processor, a microprocessor, a hardware control logic, a hardware finite state machine (FSM), a digital signal processor (DSP), a field programmable gate array (FPGA), or a combination thereof.

The control interface 704 may be used for communication between the control unit 702 and other functional units or devices of system 100, for example the client device 104, the server 112, and the push service 116. The control interface 704 may also be used for communication that is external to the functional units or devices of system 100. The control interface 704 may receive information from the functional units or devices of system 100, or from remote devices 720, or may transmit information to the functional units or devices of system 100, or to remote devices 720. The remote devices 720 refer to units or devices external to system 100.

The control interface 704 may be implemented in different ways and may include different implementations depending on which functional units or devices of system 100 or remote devices 720 are being interfaced with the control unit 702. For example, the control interface 704 may be implemented with a pressure sensor, an inertial sensor, a microelectromechanical system (MEMS), optical circuitry, waveguides, wireless circuitry, wireline circuitry to attach to a bus, an application programming interface, or a combination thereof. The control interface 704 may be connected to a communication infrastructure 722, such as a bus, to interface with the functional units or devices of system 100 or remote devices 720.

The storage unit 706 may store the software 710. For illustrative purposes, the storage unit 706 is shown as a single element, although it is understood that the storage unit 706 may be a distribution of storage elements. Also for illustrative purposes, the storage unit 706 is shown as a single hierarchy storage system, although it is understood that the storage unit 706 may be in a different configuration. For example, the storage unit 706 may be formed with different storage technologies forming a memory hierarchical system including different levels of caching, main memory, rotating media, or off-line storage. The storage unit 706 may be a volatile memory, a nonvolatile memory, an internal memory, an external memory, or a combination thereof. For example, the storage unit 706 may be a nonvolatile storage such as nonvolatile random access memory (NVRAM), Flash memory, disk storage, or a volatile storage such as static random access memory (SRAM) or dynamic random access memory (DRAM).

The storage unit 706 may include a storage interface 708. The storage interface 708 may be used for communication between the storage unit 706 and other functional units or devices of system 100. The storage interface 708 may also be used for communication that is external to system 100. The storage interface 708 may receive information from the other functional units or devices of system 100 or from remote devices 720, or may transmit information to the other functional units or devices of system 100 or to remote devices 720. The storage interface 708 may include different implementations depending on which functional units or devices of system 100 or remote devices 720 are being interfaced with the storage unit 706. The storage interface 708 may be implemented with technologies and techniques similar to the implementation of the control interface 704.

The communication unit 716 may enable communication to devices, components, modules, or units of system 100 or to remote devices 720. For example, the communication unit 716 may permit the system 100 to communicate between the client device 104, the server 112, and the push service 116. The communication unit 716 may further permit the devices of system 100 to communicate with remote devices 720 such as an attachment, a peripheral device, or a combination thereof through the network 110.

As previously indicated, the network 110 may span and represent a variety of networks and network topologies. For example, the network 110 may include wireless communication, wired communication, optical communication, ultrasonic communication, or a combination thereof. For example, satellite communication, cellular communication, Bluetooth, Infrared Data Association standard (IrDA), wireless fidelity (WiFi), and worldwide interoperability for microwave access (WiMAX) are examples of wireless communication that may be included in the network 110. Cable, Ethernet, digital subscriber line (DSL), fiber optic lines, fiber to the home (FTTH), and plain old telephone service (POTS) are examples of wired communication that may be included in the network 110. Further, the network 110 may traverse a number of network topologies and distances. For example, the network 110 may include direct connection, personal area network (PAN), local area network (LAN), metropolitan area network (MAN), wide area network (WAN), or a combination thereof.

The communication unit 716 may also function as a communication hub allowing system 100 to function as part of the network 110 and not be limited to be an end point or terminal unit to the network 110. The communication unit 716 may include active and passive components, such as microelectronics or an antenna, for interaction with the network 110.

The communication unit 716 may include a communication interface 718. The communication interface 718 may be used for communication between the communication unit 716 and other functional units or devices of system 100 or to remote devices 720. The communication interface 718 may receive information from the other functional units or devices of system 100, or from remote devices 720, or may transmit information to the other functional units or devices of the system 100 or to remote devices 720. The communication interface 718 may include different implementations depending on which functional units or devices are being interfaced with the communication unit 716. The communication interface 718 may be implemented with technologies and techniques similar to the implementation of the control interface 704.

The user interface 712 may present information generated by system 100. In some aspects, the user interface 712 allows a user 102 to interface with the devices of system 100 or remote devices 720. The user interface 712 may include an input device and an output device. Examples of the input device of the user interface 712 may include a keypad, buttons, switches, touchpads, soft-keys, a keyboard, a mouse, or any combination thereof to provide data and communication inputs. Examples of the output device may include a display interface 714. The control unit 702 may operate the user interface 712 to present information generated by system 100. The control unit 702 may also execute the software 710 to present information generated by system 100, or to control other functional units of system 100. The display interface 714 may be any graphical user interface such as a display, a projector, a video screen, or any combination thereof.

The above detailed description and aspects of the disclosed system 100 are not intended to be exhaustive or to limit the disclosed system 100 to the precise form disclosed above. While specific examples for system 100 are described above for illustrative purposes, various equivalent modifications are possible within the scope of the disclosed system 100, as those skilled in the relevant art will recognize. For example, while processes and methods are presented in a given order, alternative implementations may perform routines having steps, or employ systems having processes or methods, in a different order, and some processes or methods may be deleted, moved, added, subdivided, combined, or modified to provide alternative or sub-combinations. Each of these processes or methods may be implemented in a variety of different ways. Also, while processes or methods are at times shown as being performed in series, these processes or blocks may instead be performed or implemented in parallel, or may be performed at different times.

The resulting methods 200, 300, 400, 500, and 600, and system 100 are cost-effective, highly versatile, and accurate, and may be implemented by adapting components for ready, efficient, and economical manufacturing, application, and utilization. Another important aspect of aspects of the present disclosure is that it valuably supports and services the historic trend of reducing costs, simplifying systems, and/or increasing performance.

These and other valuable aspects of the present disclosure consequently further the state of the technology to at least the next level. While the disclosed aspects have been described as the best mode of implementing system 100, it is to be understood that many alternatives, modifications, and variations will be apparent to those skilled in the art in light of the descriptions herein. Accordingly, it is intended to embrace all such alternatives, modifications, and variations that fall within the scope of the included claims. All matters set forth herein or shown in the accompanying drawings are to be interpreted in an illustrative and non-limiting sense. Accordingly, the scope of the invention should be determined not by the aspects illustrated, but by the appended claims and their equivalents.

What is claimed is:

1. A computer implemented method for authenticating a client device, the method comprising:

transmitting, by one or more computing devices, a silent push notification to an application installed on the client device, wherein the silent push notification includes a push token provided by a push service and an embedded secret, and wherein the push token is a unique key linking the client device to the application;

receiving, by the one or more computing devices and from the application and without user input, a response to the silent push notification with a further embedded secret;

comparing, by the one or more computing devices, the embedded secret and the further embedded secret to determine if they match;

determining, by the one or more computing devices, if the application had an active session at a time the silent push notification was transmitted to the application by reviewing a log file indicating whether the application has an active session or by receiving an indication that the application does not have an active session, the indication comprising a bounce back message or no response;
if the application did not have the active session, determining, by the one or more computing devices, not to authenticate the client device, and transmit a notification to a user to perform an action for an account accessed via the application; and
if the embedded secret and the further embedded secret match and the application had the active session at the time the silent push notification was sent, authenticating the client device.

2. The method of claim 1, further comprising performing, by the one or more computing devices, an operation on the further embedded secret, wherein the operation includes a hashing or a reordering of bytes of data.

3. The method of claim 1, further comprising:
measuring, by the one or more computing devices, a response time between when the silent push notification is transmitted to the application and when the response to the silent push notification is received from the application;
authenticating, by the one or more computing devices, the client device if the response time is less than or equal to a predetermined time period.

4. The method of claim 1, wherein the application is a banking application.

5. The method of claim 1, further comprising:
receiving, by the one or more computing devices, historic responses to previous silent push notifications to the client device;
analyzing, by the one or more computing devices and using a machine learning model, the historic responses to generate a client device risk score;
authenticating, by the one or more computing devices, the client device based on the client device risk score.

6. The method of claim 1, further comprising:
encrypting, by the one or more computing devices, the silent push notification; and
transmitting, by the one or more computing devices, a public key with the encrypted silent push notification to the client device, wherein the public key is to be used by the application to decrypt the silent push notification.

7. The method of claim 1, further comprising transmitting the embedded secret in more than one transmission.

8. A non-transitory computer readable medium including instructions for authenticating a client device, with operations comprising:
transmitting a silent push notification to an application installed on the client device, wherein the silent push notification includes a push token provided by a push service and an embedded secret, and wherein the push token is a unique key linking the client device to the application;
receiving, from the application and without user input, a response to the silent push notification with a further embedded secret;
comparing the embedded secret and the further embedded secret to determine if they match;
determining if the application had an active session at a time the silent push notification was transmitted to the application by reviewing a log file indicating whether the application has an active session or by receiving an indication that the application does not have an active session, the indication comprising a bounce back message or no response;
if the application did not have the active session, determining not to authenticate the client device, and transmit a notification to a user to perform an action for an account accessed via the application; and
if the embedded secret and the further embedded secret match and the application had the active session at the time the silent push notification was sent, authenticating the client device.

9. The non-transitory computer readable medium of claim 8, the operations further comprising performing an operation on the further embedded secret, wherein the operation includes a hashing or a reordering of bytes of data.

10. The non-transitory computer readable medium of claim 8, the operations further comprising:
measuring a response time between when the silent push notification is transmitted to the application and when the response to the silent push notification is received from the application;
authenticating the client device if the response time is less than or equal to a predetermined time period.

11. The non-transitory computer readable medium of claim 8, wherein the application is a banking application.

12. The non-transitory computer readable medium of claim 8, the operations further comprising:
receiving historic responses to previous silent push notifications to the client device; and
analyzing, using a machine learning model, the historic responses to generate a client device risk score;
authenticating the client device based on the client device risk score.

13. The non-transitory computer readable medium of claim 8, the operations further comprising:
encrypting the silent push notification; and
transmitting a public key with the encrypted silent push notification to the client device, wherein the public key is to be used by the application to decrypt the silent push notification.

14. The non-transitory computer readable medium of claim 8, further comprising transmitting the embedded secret in more than one transmission.

15. A computing system for authenticating a client device comprising:
memory configured to store instructions;
a communications unit including microelectronics, coupled to the memory, configured to process the stored instructions to:
transmit a silent push notification to an application installed on the client device, wherein the silent push notification includes a push token provided by a push service and an embedded secret, and wherein the push token is a unique key linking the client device to the application,
receive, from the application and without user input, a response to the silent push notification with a further embedded secret; and
one or more processors, coupled to the memory, configured to process the stored instructions to:
compare the embedded secret and the further embedded secret to determine if they match,
determine if the application had an active session at a time the silent push notification was transmitted to the application by reviewing a log file indicating whether the application has an active session or by receiving an indication that the application does not have an active session, the indication comprising a bounce back message or no response;

if the application did not have the active session, determine not to authenticate the client device, and transmit a notification to a user to perform an action for an account accessed via the application; and if the embedded secret and the further embedded secret match and the application had the active session at the time the silent push notification was sent, authenticate the client device.

16. The system of claim 15, wherein the one or more processors are further configured to perform an operation on the further embedded secret, wherein the operation includes a hashing or a reordering of bytes of data.

17. The system of claim 15, wherein the one or more processors are further configured to:

measure a response time between when the silent push notification is transmitted to the application and when the response to the silent push notification is received from the application;

authenticate the client device if the response time is less than or equal to a predetermined time period.

18. The system of claim 15, wherein the application is a banking application.

19. The system of claim 15, wherein the one or more processors are further configured to:

receive historic responses to previous silent push notifications to the client device; and analyze, using a machine learning model, the historic responses to generate a client device risk score; and authenticate the client device based on the client device risk score.

20. The system of claim 15, wherein the one or more processors are further configured to:

encrypt the silent push notification; and transmit a public key with the encrypted silent push notification to the client device, wherein the public key is to be used by the application to decrypt the silent push notification.

* * * * *